United States Patent
Kumada

(10) Patent No.: US 9,744,918 B2
(45) Date of Patent: Aug. 29, 2017

(54) VEHICLE DECORATION STRUCTURE

(71) Applicant: Honda Access Corp., Niiza-shi, Saitama (JP)

(72) Inventor: Akira Kumada, Niiza (JP)

(73) Assignee: HONDA ACCESS CORP., Saitama (JP)

( * ) Notice: Subject to any disclaimer, the term of this patent is extended or adjusted under 35 U.S.C. 154(b) by 0 days.

(21) Appl. No.: 14/916,357

(22) PCT Filed: Nov. 12, 2013

(86) PCT No.: PCT/JP2013/080519
§ 371 (c)(1),
(2) Date: Mar. 3, 2016

(87) PCT Pub. No.: WO2015/033483
PCT Pub. Date: Mar. 12, 2015

(65) Prior Publication Data
US 2016/0207474 A1    Jul. 21, 2016

(30) Foreign Application Priority Data

Sep. 4, 2013  (JP) .................. 2013-183192

(51) Int. Cl.
*B60R 13/02* (2006.01)
*B32B 27/06* (2006.01)
(Continued)

(52) U.S. Cl.
CPC .............. *B60R 13/02* (2013.01); *B32B 27/00* (2013.01); *B32B 27/06* (2013.01); *B32B 27/08* (2013.01);
(Continued)

(58) Field of Classification Search
None
See application file for complete search history.

(56) References Cited

U.S. PATENT DOCUMENTS 7,927,688 B2 * 4/2011 Abrams ................ G09F 3/0294
  106/31.5
2008/0044677 A1 * 2/2008 Dumond ................ B32B 27/04
  428/530

FOREIGN PATENT DOCUMENTS

CN    2821754 Y    9/2006
JP    3-38242 U    4/1991
(Continued)

OTHER PUBLICATIONS

JP 03-038242 Interior Art Design device for vehicle, Morioka et al., human translation provided via STIC (Science and Technical Information Center).*

(Continued)

*Primary Examiner* — Laura Powers
(74) *Attorney, Agent, or Firm* — Westerman, Hattori, Daniels & Adrian, LLP

(57) ABSTRACT

A vehicle decoration structure for decorating a design surface (25a) in a cabin (11) is such that on the design surface (25a), there is formed a first decoration layer (31) with a first pattern (31a) that is visually recognizable with natural light. In a part of an upper surface of the first decoration layer (31), a light-accumulating material (32) having light-accumulating property and shaped in a second pattern is disposed. On upper surface of the first decoration layer (31) and the light-accumulating material (32), a second decoration layer (33) having a fluorescence pattern (33a) is formed using a fluorescence paint having no light-accumulating property.

5 Claims, 6 Drawing Sheets

(51) Int. Cl.
  *B32B 27/08* (2006.01)
  *B32B 27/00* (2006.01)
  *B32B 33/00* (2006.01)

(52) U.S. Cl.
  CPC .......... *B32B 33/00* (2013.01); *B32B 2255/28* (2013.01); *B32B 2307/40* (2013.01); *B32B 2307/422* (2013.01); *B32B 2307/50* (2013.01); *B32B 2451/00* (2013.01); *B32B 2605/00* (2013.01)

(56) References Cited

FOREIGN PATENT DOCUMENTS

| | | |
|---|---|---|
| JP | 2001-312235 A | 11/2001 |
| JP | 2002-127322 A | 5/2002 |
| JP | 4068977 B2 | 8/2004 |
| JP | 2009-156012 A | 7/2009 |

OTHER PUBLICATIONS

International Search Report dated Feb. 18, 2014, issued in counterpart Application No. PCT/JP2013/080519 (2 pages).
Office Action dated Nov. 30, 2016, issued in counterpart Chinese Application No. 201380079380.6, with partial English translation. (8 pages).

* cited by examiner

FIG.3 <u>11</u>

VEHICLE DECORATION STRUCTURE

TECHNICAL FIELD

The present invention relates to a vehicle decoration structure for decorating a design surface in a vehicle compartment.

BACKGROUND ART

There exists a technique disclosed in Patent Literature 1 as a decoration structure for decorating a design surface or the like in a vehicle compartment.

Such a decoration structure as shown in Patent Literature 1 is configured by forming a silver mirror surface layer on a surface of a product by metal plating and forming, on a surface of the silver mirror surface layer, a top coat layer containing a fluorescent paint having phosphorescence properties. In the daytime, the silver mirror surface can be visually recognized. Additionally, at night, the fluorescent paint shines as the fluorescent paint having phosphorescence properties is included in the top coat layer.

However, when energy stored in the top coat layer becomes extinct, a pattern on the surface of the product cannot be visually recognized. In other words, there is a room for improvement in terms of designability.

CITATION LIST

Patent Literature

Patent Literature 1: Japanese Patent No. 4068977

SUMMARY OF INVENTION

Technical Problem

An object of the present invention is to provide a vehicle decoration structure allowed to ensure excellent designability.

Solution to Problem

According to one aspect of the present invention, there is provided a vehicle decoration structure for decorating a design surface in a vehicle compartment, the vehicle decoration structure including: a first decorative layer formed on the design surface, a first pattern visually recognizable by a natural light being applied to the first decorative layer; a phosphorescent material arranged on the first decorative layer, the phosphorescent material having phosphorescence properties and being made into a second pattern; and a second decorative layer formed on upper surfaces of the first decorative layer and the phosphorescent material, a fluorescent pattern being applied to the second decorative layer using a fluorescent paint having no phosphorescence properties.

According to another aspect of the present invention, there is provided a vehicle decoration structure for decorating a design surface in a vehicle compartment, the vehicle decoration structure including: a first decorative layer formed on the design surface, a first pattern visually recognizable by a natural light being applied to the first decorative layer; a second decorative layer formed on an upper surface of the first decorative layer, a fluorescent pattern being applied to the second decorative layer using a fluorescent paint having no phosphorescence properties; and a phosphorescent material arranged on the second decorative layer, the phosphorescent material having phosphorescence properties and being made into a second pattern.

Advantageous Effects of Invention

In the present invention, a vehicle decoration structure includes a first decorative layer to which a first pattern is applied, a phosphorescent material made into a second pattern and arranged on the first decorative layer, and a second decorative layer to which a fluorescent pattern is applied and which is formed on upper surfaces of the first decorative layer and the second pattern. The first pattern applied to the first decorative layer can be visually recognized by a natural light. The second pattern and the fluorescent pattern can be visually recognized by applying a black light. Additionally, the second pattern emits light due to energy stored by irradiation with a natural light or a black light. Therefore, even under a condition where the pattern is not irradiated with a natural light, or a black light, it can be visually recognized for a predetermined time period.

According to the present invention, it is possible to create at least states where only the first pattern is visually recognizable, where the second and fluorescent patterns are visually recognizable, and where only the second pattern is visually recognizable. Various patterns can be created to ensure excellent designability.

Further, for example, at night, simultaneous irradiation with a white light, and a black light can also create a state where all of the first, second and fluorescent patterns are visually recognizable. On this occasion, light control of a fluorescent lamp or the black light can make the first pattern more conspicuous, or the second pattern and the fluorescent pattern more conspicuous.

In addition, a phosphorescent material made into the second pattern is sandwiched between the first decorative layer to which the first pattern is applied and the second decorative layer to which the fluorescent pattern is applied. This enables protection of the phosphorescent material without providing a further protective layer or the like on the upper surface of the second decorative layer. On the other hand, the first decorative layer and the second decorative layer have patterns applied thereon in advance, which are arranged on a design surface. This facilitates decoration of the design surface.

In the present invention, a vehicle decoration structure includes a first decorative layer to which a first pattern is applied, a second decorative layer to which a fluorescent pattern is applied and which is arranged on an upper surface of the first decorative layer, and a phosphorescent material arranged on the second decorative layer and made into a second pattern. The first pattern applied to the first decorative layer can be visually recognized with a natural light. The second pattern and the fluorescent pattern can be visually recognized by applying a black light. Additionally, the second pattern emits light, due to energy stored by irradiation with a natural light, or a black light. Therefore, even under a condition where the pattern is not irradiated with a natural light or a black light, it can be visually recognized for a predetermined time period.

According to the present invention, it is possible to create at least states where only the first pattern is visually recognizable, where the second and fluorescent patterns are visually recognizable, and where only the second pattern is visually recognizable. Various patterns can be created to ensure excellent designability.

Further, for example, at night, simultaneous irradiation with a white light and a black light can also create a state where all of the first, second and fluorescent patterns are visually recognizable. On this occasion, light control of a fluorescent lamp or the black light can make the first pattern more conspicuous, or the second and fluorescent patterns be more conspicuous.

DESCRIPTION OF EMBODIMENTS

Modes for carrying out the present invention will be described in the following based on the accompanying drawings. In the description, right and left represent right and left relative to a passenger sitting on a seat of a vehicle and front and rear represent front and rear relative to a vehicle driving direction.

Example 1

Figure 1:
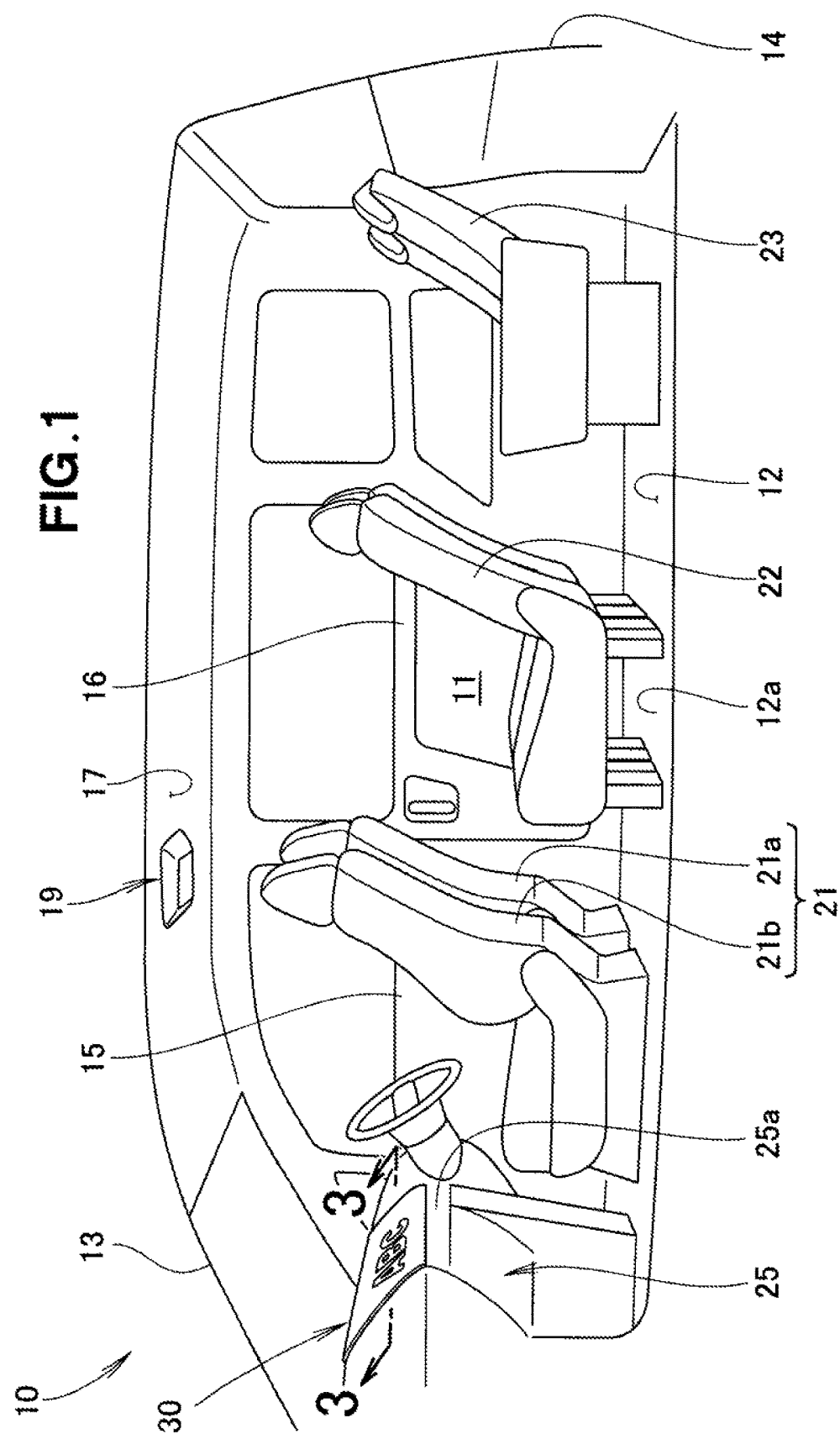
FIG. 1 is a sectional view showing a state where a vehicle is seen from its side, to which vehicle a vehicle decoration structure according to Example 1 of the present invention is applied.

As illustrated in FIG. 1, a vehicle decoration structure according to Example 1 of the present invention is applied to a vehicle 10 such as a van. A vehicle compartment or cabin 11 of such vehicle 10 is formed surrounded by a floor panel 12 forming a floor, a front glass 13 fixed to a front end of a vehicle body, a tail gate 14 rotatably attached to a rear end of the vehicle body, a plurality of doors 15, 16 attached at the right and left sides of the vehicle body (only the doors 15 and 16 attached to the right side of the vehicle body are illustrated), and a roof panel 17 forming a roof.

On an upper surface portion 12a of the floor panel 12, a plurality of seats 21 to 23 is attached on which a passenger sits. These seats 21 to 23 are made up of a first row seat 21 including a driver seat 21a and a front passenger seat 21b, a bench-type second row seat 22 provided across a direction of a width of the vehicle behind the first row seat 21, and a bench-type third row seat 23 provided across the direction of the width of the vehicle behind the second row seat 22.

In front of the first row seat 21, an instrument panel 25 is provided across the direction of the width of the vehicle. The instrument panel 25 is a part made of resin to which a glove box or an instrument is attached. On a surface 25a (design surface 25a) of the instrument panel 25, in a portion opposed to the front passenger seat 21b, a decoration portion 30 having been decorated is formed. Specifically, in the decoration portion 30, the design surface 25a in the vehicle compartment 11 is decorated.

To the roof panel 17, an indoor light 19 is attached. In the indoor light 19, a daytime white straight tube fluorescent lamp and a straight tube fluorescent lamp which radiates a black light are internally provided.

As a light, source of the indoor light 19, a light emitting diode (LED) type lamp or the like can be used other than a straight tube fluorescent lamp. Additionally, a required number of light sources can be attached as well. In other words, a kind of light source, the number of the same, its color and the like can be arbitrarily set according to a purpose. In the following figures, detailed description will be made of the decoration portion 30.

Figure 2:
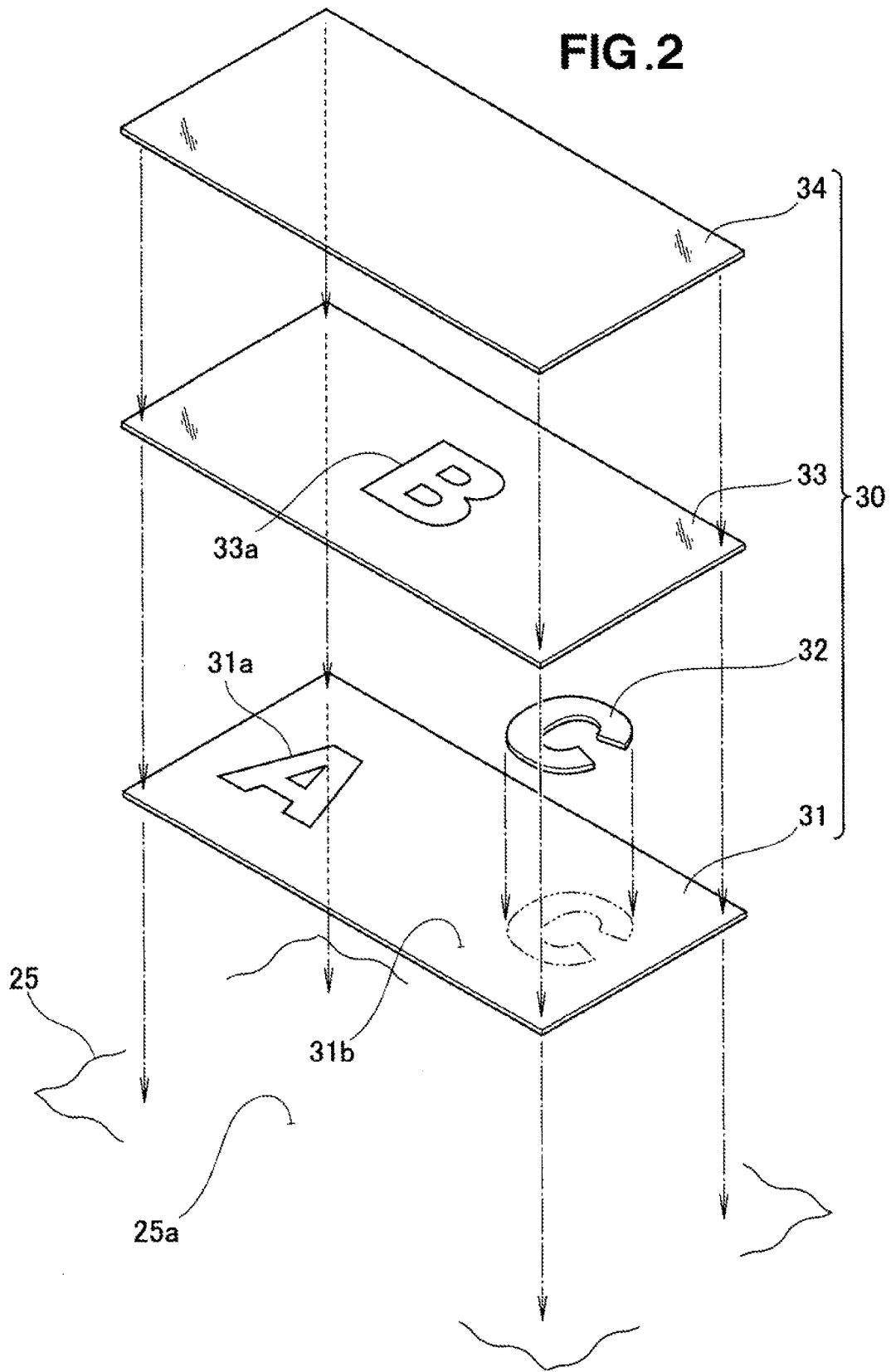
FIG. 2 is an exploded perspective view of a decoration portion illustrated in FIG. 1.
Figure 3:
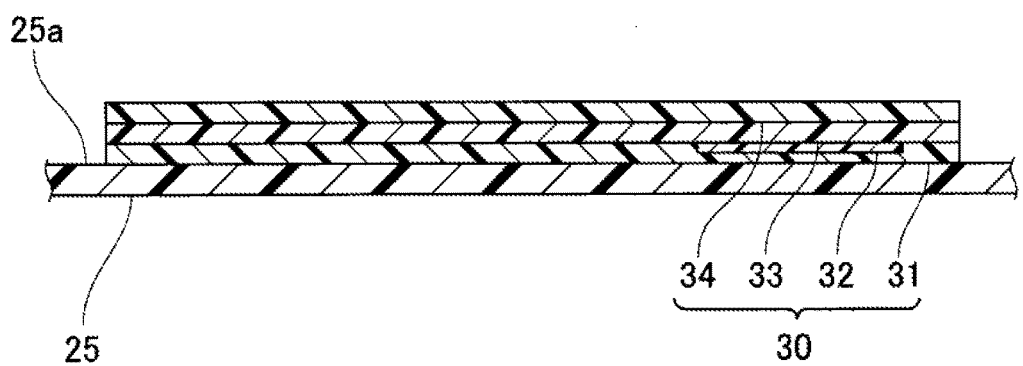
FIG. 3 is a sectional view taken along line 3-3 of FIG. 1.

As illustrated in FIGS. 2 and 3, the decoration portion 30 includes a sheet-shaped first decorative layer 31 which is provided on the surface 25a of the instrument panel 25 and to which a first pattern 31a is attached, a phosphorescent material 32 arranged on an upper surface 31b of the first decorative layer 31 and having phosphorescence properties, a second decorative layer 33 which is adhered to upper surfaces of the first decorative layer 31 and the phosphorescent material 32 and to which a fluorescent pattern 33a is attached, and a protective layer 34 adhered to an upper surface of the second decorative layer 33 to protect the second decorative layer 33.

As an example of a configuration of the first decorative layer 31, a possible configuration includes a plurality of sheets integrated by adhering a sheet with the first pattern 31a printed thereon to an adhesive sheet. As an adhesive sheet, a polyvinyl butyral (PVB) sheet can be used. Printing a pattern can be performed by an ink jet printer. When the first decorative layer 31 is formed of a plurality of sheets, the first pattern 31a may be attached to at least one of the sheets. On the other hand, when the first decorative layer 31 is configured with one sheet, it is essential for the sheet to have the first pattern 31a attached thereto. Also for the second decorative layer 33, the same configuration as that of the first decorative layer 31 can be adopted.

The first pattern 31a is painted using a paint, visually recognizable by a natural light. The first pattern 31a is visually recognizable under a white light. A paint for paining the first pattern 31a is neither a fluorescent paint nor has phosphorescence properties.

The phosphorescent material 32 is formed into a shape of a second pattern. In other words, the second pattern has the shape of the phosphorescent material 32. In the following, the phosphorescent material 32 will be appropriately referred to as the "second pattern 32". In the figures, although the first decorative layer 31 and the second decorative layer 33 are illustrated to be thicker than usual for the purpose of explanation, the phosphorescent material 32 is usually a member thicker than the first decorative layer 31 and the second decorative layer 33. Therefore, providing the phosphorescent material 32 therebetween can give stereoscopic effects to a pattern. For example, by varying a thickness of the phosphorescent material 32 with a part in order to have a three-dimensional configuration, excellent designability can be obtained. Additionally, regardless of the presence of the protective layer 34, the phosphorescent material 32 can be protected. More specifically, the phosphorescent material 32 can be formed into an animal shape or a flower shape.

The fluorescent pattern 33a is painted using a fluorescent paint having no phosphorescence properties. The fluorescent pattern 33a can be hardly recognized visually under a natural light or a white light.

The decoration portion 30 is formed by forming, on the surface 25a of the instrument panel 25, the first decorative layer 31 with the first pattern 31a applied thereon, arranging the phosphorescent material 32 on the upper surface of the first decorative layer 31, covering the upper surfaces of the first decorative layer 31 and the phosphorescent material 32 with the second decorative layer 33 and arranging the protective layer 34 on the upper surface of the second decorative layer 33.

For the first decorative layer 31, the second decorative layer 33 and the protective layer 34, arbitrary materials or configurations can be adopted according to a purpose other than the above-described materials and configurations.

Additionally, for the purpose of understanding of the present invention, the first pattern 31a, the second pattern (the phosphorescent material 32) and the fluorescent pattern 33a are illustrated not to overlap with each other in the present Example. In this regard, the respective patterns may be arranged to overlap with each other when the decoration portion 30 is seen from the front. Description will be made of functions of such decoration portion 30 with reference to FIGS. 4(a) to 4(c).

Figure 4:
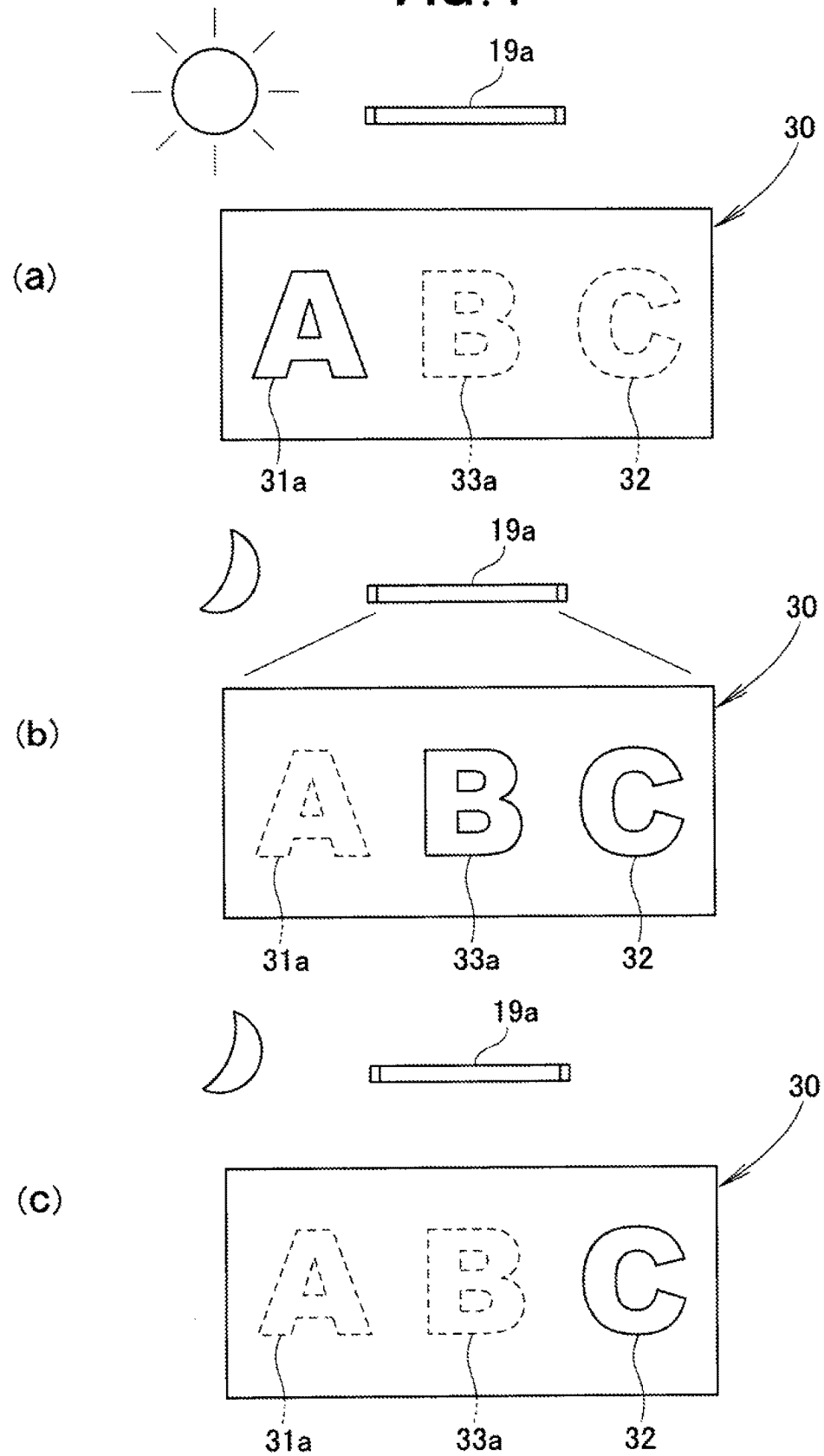
FIGS. 4(a) to 4(c) are diagrams for explaining functions of the decoration portion illustrated in FIG. 1.

With reference to FIG. 4(a) and FIG. 1, in the daytime, a natural light enters the vehicle compartment 11. In this state, when the black light 19a internally provided in the indoor light 19 is turned off, only the first pattern 31a can be visually recognized. The natural light can be replaced by a white light. Specifically, also when only a white light is turned on at night, only the first pattern 31a can be visually recognized.

With reference to FIG. 4(b) and FIG. 1, at night, no natural light, enters the vehicle compartment. In this state, when the black light 19a is turned on, the second pattern 32 and the fluorescent pattern 33a can be visually recognized. On this occasion, the first pattern 31a cannot be visually recognized.

With reference to FIG. 4(c) and FIG. 1, the black light 19a is turned off in the state of FIG. 4(b) and after a while, only the second pattern 32 can be visually recognized. The second pattern 32 emits light until energy stored when irradiated with the black light 19a becomes extinct. On this occasion, the first pattern 31a and the second pattern 32 cannot be visually recognized.

Assuming that the black light 19a is turned on in a state where a natural light enters the vehicle compartment 11 (or a state where the white light is turned on), the pattern is differently seen depending on an energy intensity of the natural light or the black light. Specifically, when energy of the natural light is relatively high, the first pattern 31a is more conspicuous. On the other hand, when energy of the black light is relatively high, the second pattern 32 and the fluorescent pattern 33a are more conspicuous.

Additionally, there is a case where early at night, the black light 19a is turned off. In this case, due to energy of sunlight stored in the daytime, only the second pattern 32 can be visually recognized.

According to the present invention, it is possible to create at least states where only the first pattern 31a is visually recognizable, where the second and fluorescent patterns 32, 33a are visually recognizable, and where only the second pattern 32 is visually recognizable. Various patterns can be created to ensure excellent designability.

Further, simultaneous irradiation with a white light and the black light 19a can also create a state where all of the first to fluorescent patterns 31a, 32, 33a are visually recognizable. On this occasion, light, control of the white light or the black light can make the first pattern 31a more conspicuous, or the second and fluorescent patterns 32, 33a be more conspicuous. An example of use of the vehicle decoration structure having such decoration portion 30 will be described with the following figures.

Figure 5:
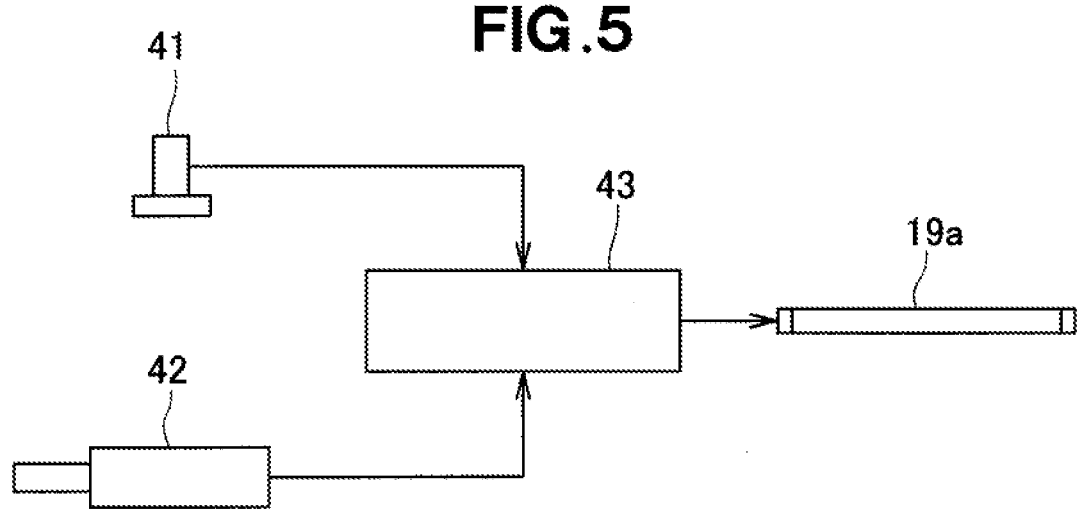
FIG. 5 is a schematic diagram for explaining an example of use of the vehicle decoration structure illustrated in FIG. 1.

As illustrated in FIG. 5, the vehicle 10 is provided with an illumination sensor 41 which detects brightness outside a vehicle, a vehicle speed sensor 42 which detects a speed of a vehicle, and a control unit 43 which receives detection signals of the illumination sensor 41 and the vehicle speed sensor 42 and controls an illumination of the black light 19a based on the detection signals.

Figure 6:
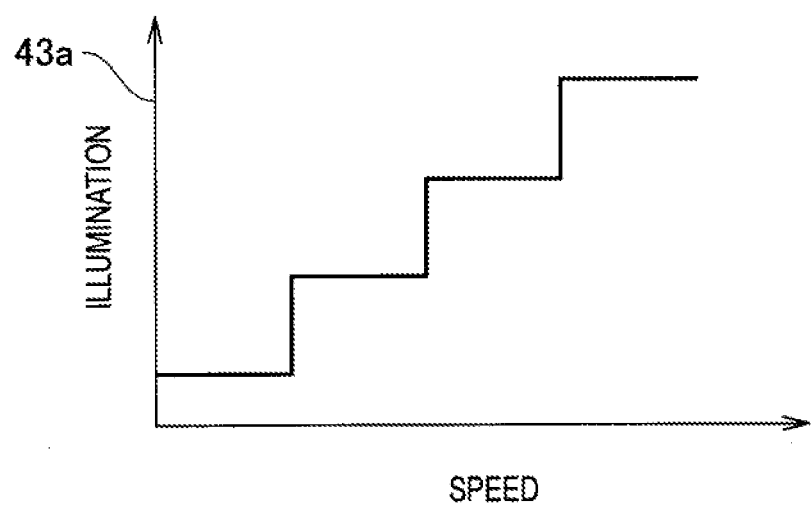
FIG. 6 is a diagram for explaining a map input to a control unit illustrated in FIG. 5 in advance.

With reference to FIG. 6 as well, a map 43a is input into the control unit 43 in advance. The control unit 43 determines an illumination of the black light 19a according to a speed based on the map 43a. The illumination of the black light 19a, in a case where a plurality of light sources is provided, can be controlled according to the number of black lights 19a to be turned on. These functions will be described in detail with reference to the following figure as well.

Figure 7:
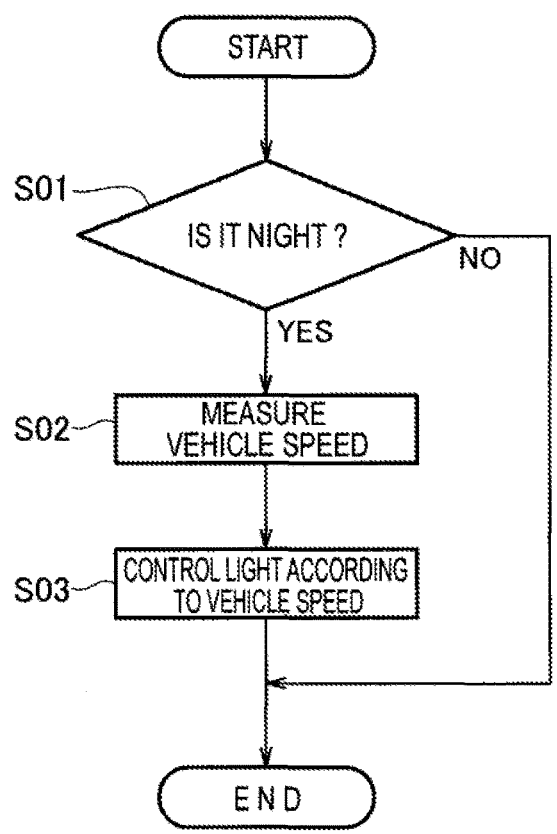
FIG. 7 is a flow chart for explaining an example of use of the vehicle decoration structure illustrated in FIG. 1.

With reference to FIG. 7 as well, the illumination sensor 41 detects whether it is night or not at step S01. More specifically detection is made as to whether it is night or not according to whether an illumination outside the vehicle is lower than a predetermined value or not. When the illumination outside the vehicle is lower than the predetermined value, the illumination sensor 41 detects that it is night. When the illumination outside the vehicle is the predetermined value or higher, the illumination sensor 41 detects that it is not night. The illumination sensor 41 transmits this information as an electric signal to the control unit 43.

When it is night, the processing proceeds to step S02. In this case, the vehicle speed sensor 42 detects a vehicle speed of the vehicle. The detected speed is transmitted to the control unit 43 by an electric signal. Proceeding to step S03, the control unit 43 changes the illumination according to the vehicle speed. On the other hand, when determination is made at step S01 that it is not night, the processing is finished.

When it is determined to be night, as the speed increases, the illumination of the black light 19a is raised. At night, it is hard to see the outside of the vehicle, so that a driver tends to increase a speed. It is configured to raise the illumination of the black light 19a as the speed is increased, thereby making a pattern be more conspicuous. This enables the driver to feel the speed increasing. In other words, when the speed is increasing, driver's attention can be visually attracted. It is useful because the driver's attention can be attracted while maintaining excellent designability.

Example 2

Figure 8:
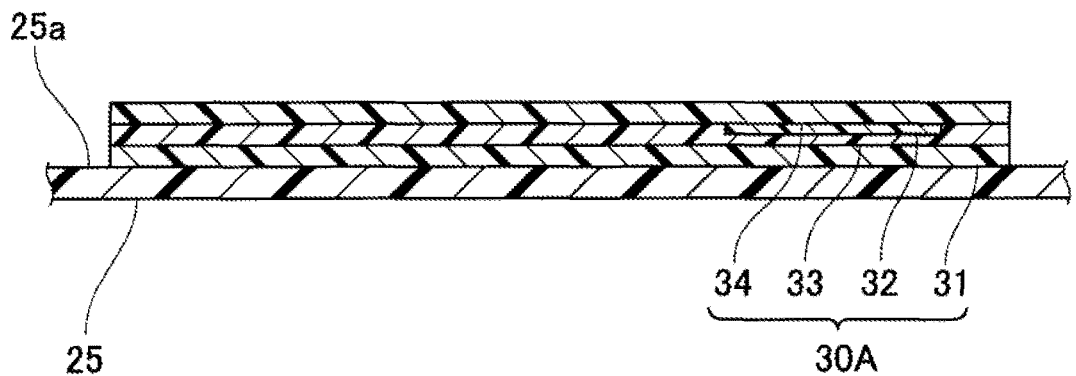
FIG. 8 is a sectional view of a decoration structure to be adopted for a vehicle according to Example 2 of the present invention.

Next, Example 2 of the present invention will be described based on the drawings. FIG. 8 shows a sectional configuration of a decoration portion to be adopted for a vehicle of Example 2, which corresponds to the above FIG. 3. As compared with Example 1, a part where the second pattern 32 is arranged is changed. The remaining basic configuration is the same as that of Example 1.

As illustrated in FIG. 8, on a surface 25a of an instrument panel 25, a decoration portion 30A is formed. In the decoration portion 30A, a first decorative layer 31 is formed on which a first pattern visually recognizable by a natural light is applied, on an upper surface of the first decorative layer 31, a second decorative layer 33 is formed on which a fluorescent pattern is applied using a fluorescent paint having no phosphorescence properties, on the second decorative layer 33, a phosphorescent material 32 is arranged which has phosphorescence properties and is made into a second pattern, and a protective layer 34 is arranged on upper surfaces of these second decorative layer 33 and the phosphorescent material 32. Even when adopting such a configuration, a predetermined effect of the present invention can be achieved.

While the decoration structure of the present invention has been described with respect to the examples where the decoration portion is formed on the surface of the instrument, panel, the decoration portion may be formed in a glove box or the like. In other words, a design surface includes every part which can be visually recognized by a passenger in ordinary use. Additionally, the decoration portion can be formed at an arbitrary position such as a roof panel, a floor panel or each door other than an instrument panel. In other words, as long as it is a design surface in the vehicle compartment, the decoration portion can be formed at an arbitrary position even in other part than a resin part.

Further, it is also possible to turn on the black light only for a predetermined time period to make the second and fluorescent patterns appear after the vehicle is unlocked. Specifically, in place of a so-called welcome lamp, the black light can make the patterns appear. In this case, appearance of the pattern can improve designability of the vehicle compartment.

INDUSTRIAL APPLICABILITY

The vehicle decoration structure of the present invention is suitable for a passenger car.

REFERENCE SIGNS LIST

10 Vehicle
11 Vehicle compartment
25a Surface of instrument, panel (design surface)
31 First decorative layer
31a First pattern
32 Phosphorescent material (second pattern)
33 Second decorative layer
33a Fluorescent pattern

The invention claimed is:

1. A vehicle decoration structure for decorating a design surface in a vehicle compartment, comprising:
   a first decorative layer formed on the design surface
   a first pattern applied to an upper surface of the first decorative layer, the first pattern designed to be visually recognizable by a natural light;
   a phosphorescent material arranged on the upper surface of the first decorative layer, the phosphorescent material having phosphorescence properties and being made into a second pattern; and
   a second decorative layer formed on the upper surface of the first decorative layer and an upper surface of the phosphorescent material; and
   a fluorescent pattern applied to an upper surface of the second decorative layer, the fluorescent pattern formed with a fluorescent paint having no phosphorescence properties,
   wherein the phosphorescent material made into the second pattern is interposed between the first decorative layer to which the first pattern is applied and the second decorative layer to which the fluorescent pattern is applied.

2. A vehicle decoration structure for decorating a design surface in a vehicle compartment, comprising:
   a first decorative layer formed on the design surface;
   a first pattern applied to an upper surface of the first decorative layer, the first pattern designed to be visually recognizable by a natural light;
   a second decorative layer formed on the upper surface of the first decorative layer;
   a fluorescent pattern applied to an upper surface of the second decorative layer, the fluorescent pattern formed with a fluorescent paint having no phosphorescence properties; and
   a phosphorescent material arranged on the upper surface of the second decorative layer, the phosphorescent material having phosphorescence properties and being made into a second pattern,
   wherein the phosphorescent material is thicker than the first decorative layer and the phosphorescent material is thicker than the second decorative layer.

3. The vehicle decoration structure according to claim 1, wherein the phosphorescent material is thicker than the first decorative layer and the phosphorescent material is thicker than the second decorative layer.

4. The vehicle decoration structure according to claim 2, wherein the phosphorescent material has a three dimensional shape with a varying thickness.

5. The vehicle decoration structure according to claim 3, wherein the phosphorescent material has a three dimensional shape with a varying thickness.

* * * * *